US010036511B2

United States Patent
Dicke et al.

(10) Patent No.: US 10,036,511 B2
(45) Date of Patent: Jul. 31, 2018

(54) SYSTEM AND METHOD FOR MEASURING PRESSURE AND REMOVING FLUID FROM BEHIND A FLANGE OF PIPELINE

(71) Applicant: KPL South Texas, LLC, Wichita, KS (US)

(72) Inventors: Troy Allen Dicke, Red Wing, MN (US); Steven Clay Molmen, Hastings, MN (US); Shawn Allen Waidelich, St. Paul, MN (US)

(73) Assignee: KPL South Texas, LLC, Wichita, TX (US)

( * ) Notice: Subject to any disclaimer, the term of this patent is extended or adjusted under 35 U.S.C. 154(b) by 0 days.

(21) Appl. No.: 15/273,134

(22) Filed: Sep. 22, 2016

(65) Prior Publication Data

US 2017/0082246 A1    Mar. 23, 2017

Related U.S. Application Data

(60) Provisional application No. 62/222,649, filed on Sep. 23, 2015.

(51) Int. Cl.
| | |
|---|---|
| *F17D 1/20* | (2006.01) |
| *F17D 3/10* | (2006.01) |
| *F16L 41/00* | (2006.01) |
| *F16L 45/00* | (2006.01) |
| *G01L 19/00* | (2006.01) |

(52) U.S. Cl.
CPC .............. *F17D 1/20* (2013.01); *F16L 41/008* (2013.01); *F16L 45/00* (2013.01); *F17D 3/10* (2013.01); *G01L 19/0007* (2013.01); *Y10T 137/6137* (2015.04)

(58) Field of Classification Search
CPC .... F17D 1/20; F17D 3/10; F16L 41/00; F16L 45/00; G01L 19/0007; Y10T 137/6137
See application file for complete search history.

(56) References Cited

U.S. PATENT DOCUMENTS

| 2,589,170 A | 3/1952 | Ver Nooy | |
| 3,760,842 A * | 9/1973 | Mikiya | ............ F16L 39/00 137/557 |
| 4,026,153 A | 5/1977 | Silverwater | |
| 4,082,002 A | 4/1978 | Baugh | |

(Continued)

FOREIGN PATENT DOCUMENTS

GB          319146 A       9/1929

OTHER PUBLICATIONS

International Search Report & Written Opinion for corresponding patent application No. PCT/US2016/053121, dated Dec. 20, 2017. (14 pages).

*Primary Examiner* — Craig Schneider
*Assistant Examiner* — Kevin Barss (57) ABSTRACT

The present invention relates to a system and method of inspecting and relieving pressure and fluid from a pipeline in a safe and environmentally friendly manner. An adjustable insert is placed within a flange of the pipeline, where the adjustable insert has a valve stem capable of moving into contact with a valve device to regulate fluid or gas from the pipeline and one or more outlets for relieving pressure or withdrawing fluid from the pipeline. The system and method provided are capable of operating in a closed process without loosening or removing a flange of the pipeline, thereby improving pipeline operator safety.

17 Claims, 6 Drawing Sheets

(56) References Cited

U.S. PATENT DOCUMENTS

| | | | | |
|---|---|---|---|---|
| 5,129,423 A | * | 7/1992 | Fournier | F16L 37/0985 |
| | | | | 137/322 |
| 5,546,979 A | * | 8/1996 | Clark, II | B09B 3/0058 |
| | | | | 123/196 A |
| 6,991,216 B1 | | 1/2006 | Wilson | |
| 2006/0278271 A1 | * | 12/2006 | Liu | E03C 1/106 |
| | | | | 137/218 |

* cited by examiner

SYSTEM AND METHOD FOR MEASURING PRESSURE AND REMOVING FLUID FROM BEHIND A FLANGE OF PIPELINE

CROSS-REFERENCE TO RELATED APPLICATIONS

This application claims priority to U.S. Provisional Patent Application Ser. No. 62/222,649, filed on Sep. 23, 2015.

TECHNICAL FIELD

The present invention relates to a novel system that can be used in a safe and environmentally friendly manner to measure the pressure and remove the fluid behind a flange in a pipeline in a closed process without loosening or removing the flange, and to related methods to make and use the system.

BACKGROUND OF THE INVENTION

The efficient transportation of petroleum products (crude oil, gasoline, chemicals, natural gas) is critical to meeting the world's energy demands. Pipelines, rail cars, tankers, ships, and trucks all work in harmony in the transportation network to deliver energy to consumers. The most critical component of this network is the pipeline. North America alone depends on over 185,000 miles of liquid petroleum pipelines, 320,000 miles of gas transmission pipelines, and more than two million miles of gas distribution pipelines. Petroleum products will spend the majority of their transportation time in the pipeline.

Ideally, the pipeline is constantly transporting petroleum products with little or no downtime. However, in certain circumstances, transportation may stop for repair or maintenance purposes to the pipeline or distribution equipment. During the oil pipeline repair or maintenance, it is often required to remove a blind flange at the end of an oil pipe. To ensure a technician's safety and environmental safety, prior to the removal of the blind flange, it is critical that there is no significant amount of oil in the pipeline and there is no pressure build-up behind the flange. If there is any remaining oil or higher than atmospheric pressure inside the pipeline, the oil should be removed and the pressure should be released before removing the flange. However, currently there is no apparatus, safe and closed process, or method that can measure the pressure, remove oil, and release high pressure gases without removing the flange. Pipeline operators normally complete the check by loosening a few bolts/studs holding the blind flange in place and wait to see if oil leaks out. This is risky from both an environmental and safety perspective. Fluids in the pipeline, such as oil, may be sprayed onto personnel or nearby objects, and cannot be stopped except for quickly tightening the flange. Additionally, using this method can give a false indication that the product is continually filling what should be a void space.

U.S. Pat. No. 4,082,002 discloses an apparatus for mounting a pressure gauge or pressure transducer for measuring the pressure in a high pressure manifold or line. Some commercially available diaphragm flange devices can also be used to measure the pressure behind a flange in a pressure manifold or line. However, there is no known disclosure for an apparatus that can both measure pressure within a pipeline as well as remove fluid such as oil from a pipeline in a closed process without removing the flange. In addition, the apparatus disclosed in the prior art is not suitable for oil pipelines that are buried in the soil for extended period of time because the complicated underground soil conditions may damage the pressure measuring devices due to moisture level and other potential corrosive conditions.

BRIEF SUMMARY OF THE INVENTION

There remains a need for some safe and environmentally friendly apparatus and method to first find if there is high pressure behind the flange and then second, remove the oil inside the pipe without removing the flange. If there is no pressure reading higher than atmospheric pressure behind the flange, operators can safely remove the flange. However, if there is a higher than atmospheric pressure found behind the flange, operators can remove the oil or other potentially dangerous materials out of the pipeline prior to removing the flange for repair or maintenance work.

Thus, embodiments of the present invention provide a novel system and safe and environmentally friendly method for measuring the pressure behind a flange of a pipeline and also providing a way of removing fluid from behind the flange in a closed process (i.e. without having to loosen and remove the flange) thereby ensuring personal and environmental safety.

In an embodiment of the present invention, a pipeline inspection system is provided comprising a flange body having opposing first and second surfaces and a bore extending therethrough. The flange body is coupled to a pipeline and includes a valve device positioned within the flange body and an adjustable insert having a valve stem capable of moving within a tube to selectively contact and open the valve device, thereby allowing a flow of pipeline contents to pass through the valve device and to one or more outlets. The valve stem is adjustably-coupled to the tube where the valve stem has a first end and opposing second end, where the second end is sized to engage the valve device. A sealing mechanism, such as an O-ring, is positioned between the valve stem and the tube.

In an alternate embodiment of the present invention, a method of adjusting a valve in a pipeline flange is provided. The method comprises removing a fastener from a bore of the flange body and placing an adjustable insert in the bore, where the adjustable insert comprises a tube and adjustable valve stem. The valve stem translates to move towards and into contact with a valve device, causing the valve device to open.

In yet another alternate embodiment of the present invention, a method of removing fluid from a pipeline is provided comprising removing a fastener from a bore of the pipeline, placing an adjustable insert in the bore, where the adjustable insert comprises a tube and adjustable valve stem, and attaching a vacuum device to an outlet of the tube. The valve stem is then translated towards and into contact with a valve device, causing the valve device to open and permitting fluid from behind the flange to be removed by the vacuum device through an outlet in the tube of the adjustable insert.

The present invention is designed to regulate and control movement of a valve device located within a flange body for an underground pipeline. As such, portions of the present invention may be safely buried in the soil and other elements of the present invention may not be buried so as to be more accessible. Through the present invention, methods of measuring pressure inside a pipeline and behind a flange are provided as well as a method of removing fluid from behind the flange body of the pipeline.

These and other features of the present invention can be best understood from the following description and claims.

BRIEF DESCRIPTION OF THE SEVERAL VIEWS OF THE DRAWINGS

The present invention is described in detail below with reference to the attached drawing figures. It is understood that the dimensions such as the thickness, length or width of each section in any part of the illustrated apparatus may be exaggerated in each figure for the sole purpose of illustration. They should not be considered the actual or relative thickness, length or width of any section of the apparatus of the present invention in each FIG.

DETAILED DESCRIPTION OF THE INVENTION

The present invention is intended for use in a pipeline containing oil, gas, or other potentially dangerous fluid, where it is important to know pressure in the pipeline prior to accessing the pipeline. The present invention provides an improved system and method for understanding and determining the pressure within a pipeline, thereby improving personnel and environmental safety. The present invention is designed to operate underground, above ground, or in a combination of locations, as may be needed depending upon the location of the pipeline and access points. The apparatus and methods provided will be better understood in view of FIGS. 1-6.

Figure 1:
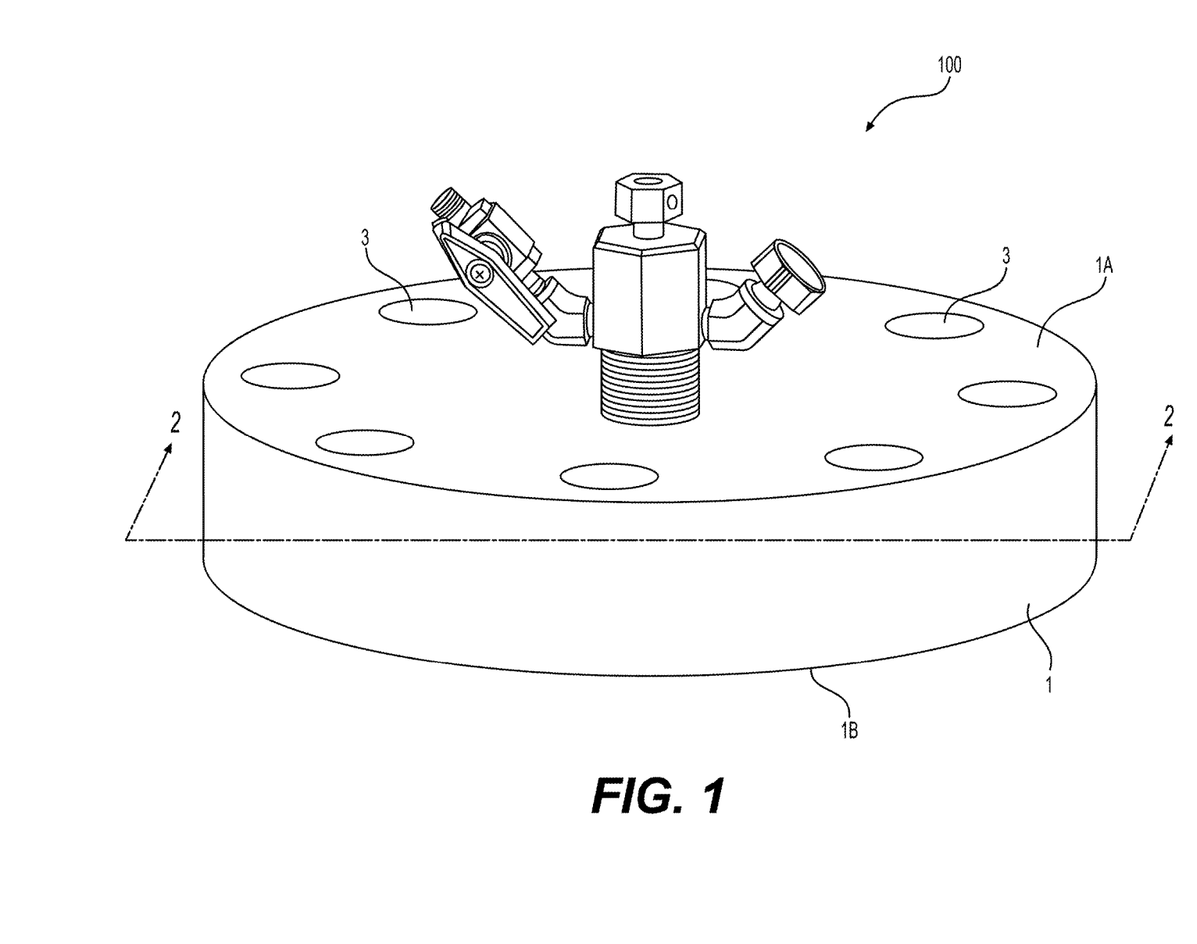
FIG. 1 depicts a perspective view of an embodiment of the present invention.
Figure 2:
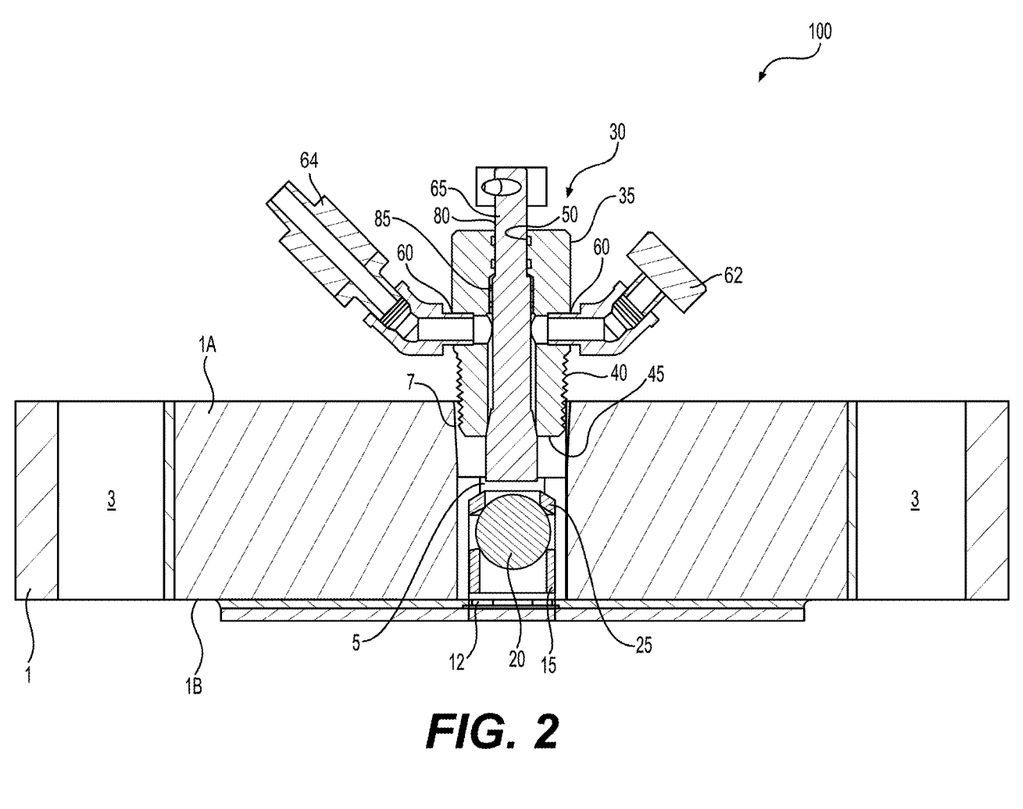
FIG. 2 depicts a cross section view of the embodiment of the present invention in FIG. 1.
Figure 3:
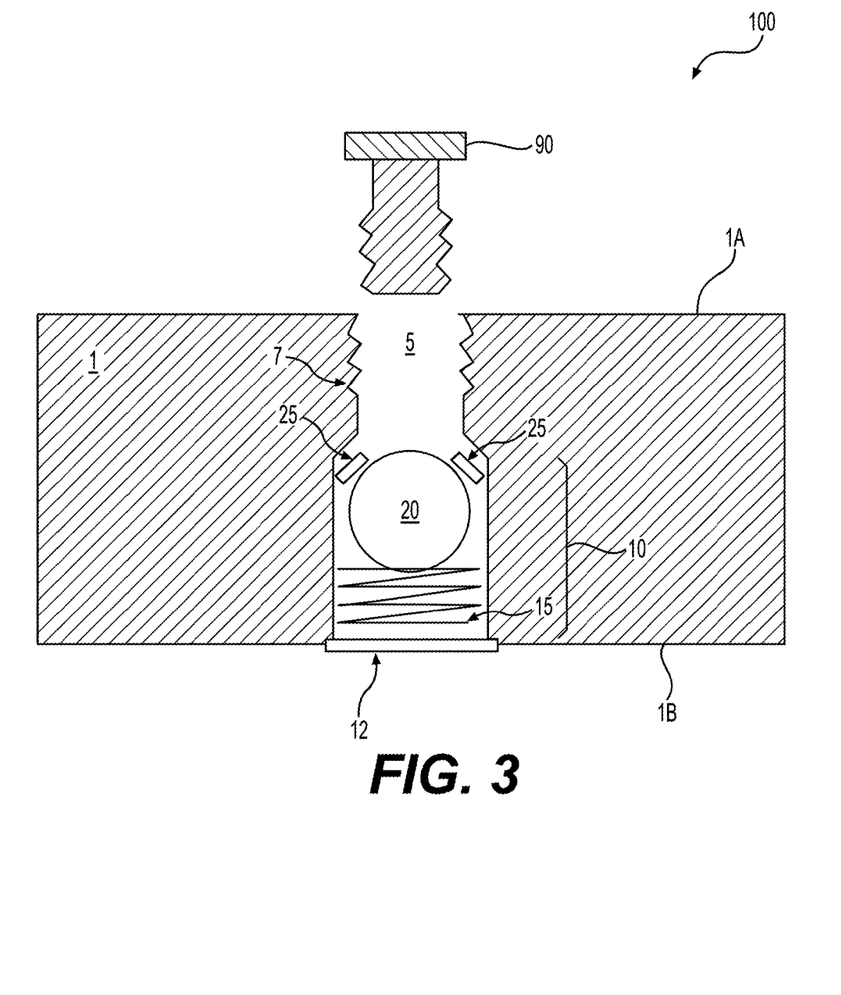
FIG. 3 depicts a cross section view of a portion of the present invention.

Referring initially to FIGS. 1-3, a pipeline inspection system 100 is provided comprising a flange body 1 having a first surface 1A, an opposing second surface 1B, and a bore 5 extending through the flange body 1 and between the flange body surfaces. The bore 5 may comprise a larger portion and a smaller portion, as shown in FIG. 3, but is designed to house a valve device 10 positioned within the flange body 1. In an embodiment of the present invention, the flange body 1 also includes a plurality of threads 7 in the inner surface of bore 5, as shown in FIGS. 2 and 3. The threads 7 are used for engaging a fastener 90, such as a bolt or cap, as well as for engaging a tube portion of an adjustable insert 30, as will be discussed in more detail below.

The valve device 10 comprises a retainer 12 that is positioned in contact with the second surface 1B of the flange body 1 and is also in direct contact with the contents in the pipeline. The valve device 10 also includes a spring 15, a stopper 20, and a seat 25. The seat 25 is in contact with internal walls of the bore 5, and the stopper 20 and spring 15 are positioned such that the stopper 20 is in contact with the seat 25 and provides a sealing surface when the valve device is in a closed position.

The stopper 20 can take on a variety of configurations depending on the specific pipeline inspection system. One such acceptable stopper 20 configuration is a ball valve, such as that depicted in FIGS. 2, 3, and 6. When the ball is in contact with the seat 25, as shown in FIG. 2, a seal is created in the valve device 10. However, when the ball moves away from the seat 25 and compresses the spring 15, the retainer 12 moves away from the second surface 1B of the flange body 1, thereby opening the valve device 10. Although not shown, it is envisioned that the valve device 10 may take on other configurations, such as a plunger valve, check valve, butterfly valve, choke valve, plate valve, or other similar configuration designed to restrict the flow of a liquid or gas. For example, the stopper 20 may take on configurations such as a plunger or a plate arrangement.

Figure 4:
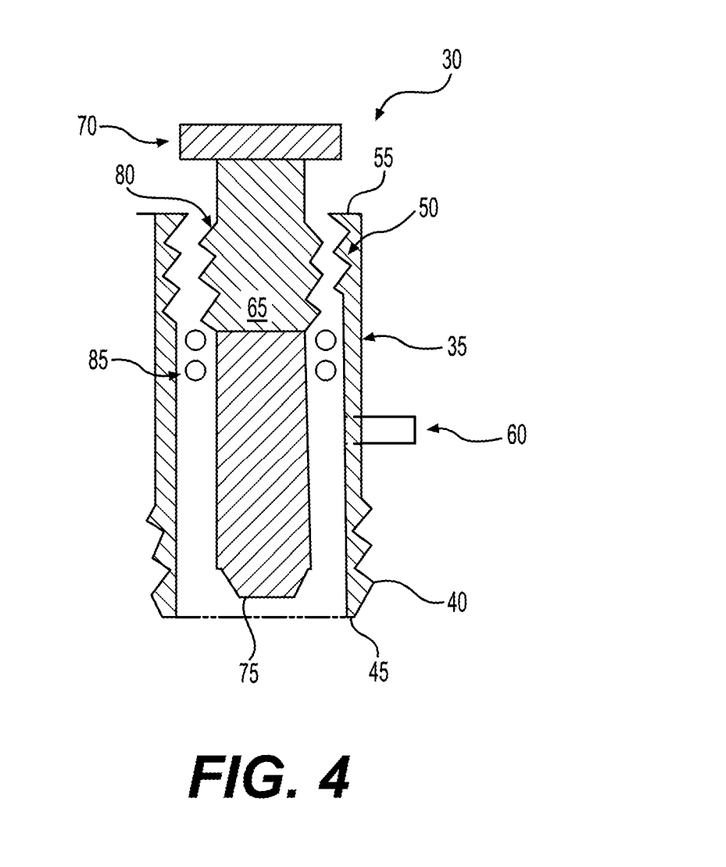
FIG. 4 depicts a cross section view of an alternate portion of the present invention.
Figure 5:
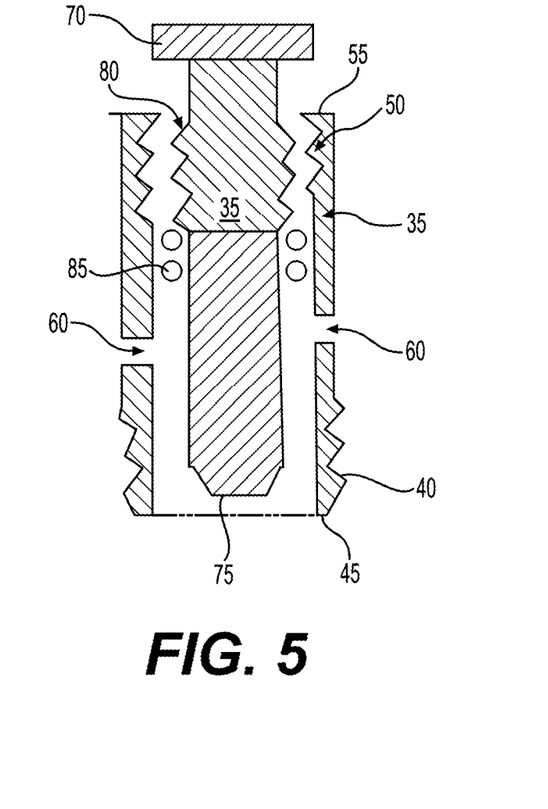
FIG. 5 depicts a cross section view of an alternate portion of the present invention in accordance with an alternate embodiment.

The inspection system 100 also comprises an adjustable insert 30 as shown in FIGS. 2 and 4-6. The adjustable insert 30 comprises a tube 35 that is coupled to the flange body 1. One such acceptable way of coupling the tube 35 to the flange body 1 is through a plurality of external threads 40 proximate a first tube end 45. The tube 35 may also comprise a plurality of internal threads 50 proximate a second tube end 55. The tube 35 also comprises one or more outlets 60 extending through a wall of the tube 35. FIG. 4 depicts a tube 35 with one outlet 60 while FIG. 5 depicts a tube 35 with two outlets 60. Depending on the embodiment of the present invention, the outlet 60 may be connected to a pressure gauge 62 to measure the internal pressure of a pipeline behind the flange body 1 or it may be connected to a vacuum device 64 to remove fluid from the pipeline. It is also possible for the one or more outlets 60 to provide a connection point for other instrumentation or equipment. The one or more outlets 60 may comprise a male outlet, female outlet or a combination thereof. In one embodiment, the two outlets 60 are both female outlets and have internal threads configured to receive a vacuum device 64 and/or pressure gauge 62. A person of ordinary skill in the art will appreciate that the outlet(s) 60 may have means other than threads for connecting to a vacuum device, pressure gauge, or other instrumentation.

The adjustable insert 30 also comprises a valve stem 65 adjustably-coupled to the tube 35. The valve stem 65 has a first end 70 and opposing second end 75 where the second end 75 is sized to engage the valve device 10. For the embodiment described above, the valve stem 65 is coupled to the tube 35 by a threaded engagement where threads 80 positioned along the outer surface of the valve 65 are coupled to internal threads 50 in tube 35 and operate to move the valve stem 65 up and down within tube 35 upon rotation of valve stem 65.

The second end 75 of the valve stem 65 is sized to engage the stopper 20 of the valve device 10 such that, upon rotation of the first end 70, the valve stem 65 rotates and moves towards the valve device 10 due to its threaded engagement with the tube 35. Through continued rotation of the valve stem 65 within the tube 35, the valve stem 65 comes into contact with the stopper 20 and presses on the stopper 20, causing the spring 15 to compress and overcome the force applied by spring 15, and moving the retainer 12 downward to an open position. The contents within the pipeline are then permitted to flow upwards through bore 5, through the opening in the seat 25, through a passageway 37 located between an inner diameter of the tube 35 and an outer diameter of the valve stem 65, and exits through an outlet 60. The distance retainer 12 is opened as well as the size of the flow passage created between the valve stem 65 and the tube 35 may vary depending on the contents of the pipeline.

Figure 6:
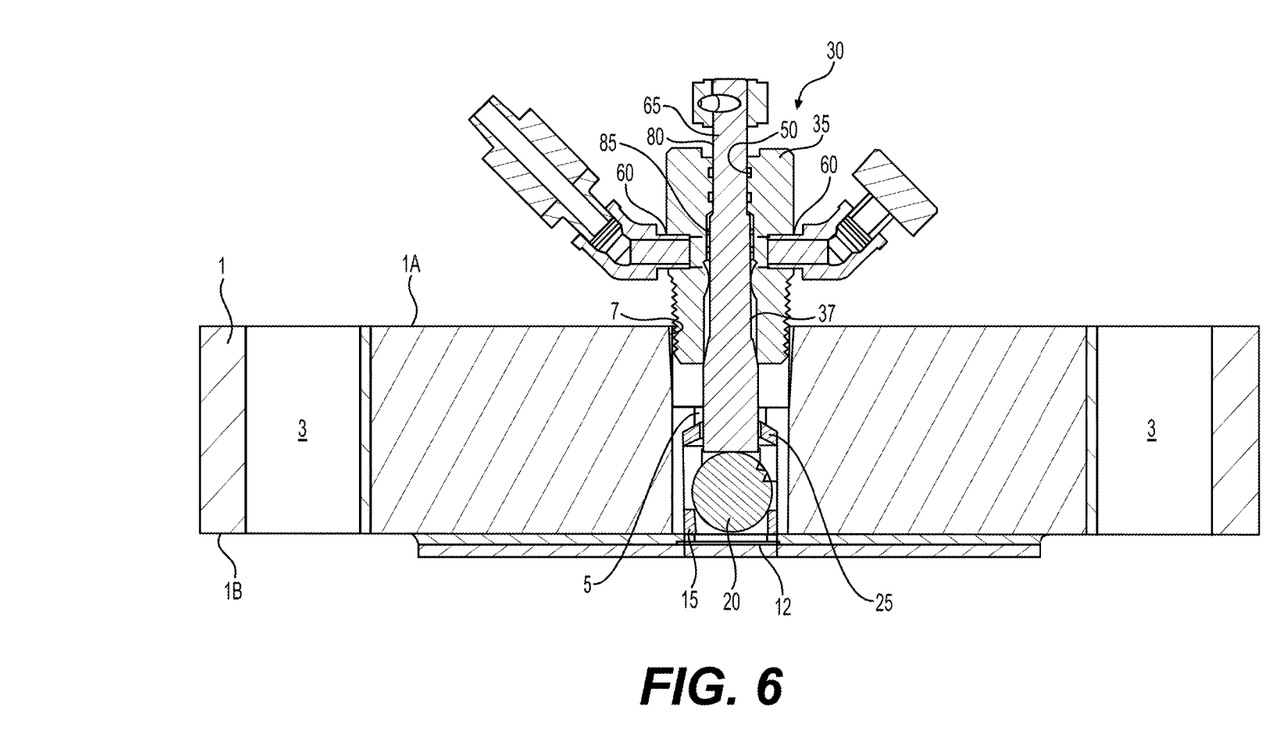
FIG. 6 depicts a cross section view of the present invention where a portion of the present invention is in an alternate position than that depicted in FIG. 2.

The contents of the pipeline can be measured at an outlet 60 by a pressure gauge or withdrawn from the pipeline by a vacuum device coupled to an outlet 60. Once the pressure is at an acceptable level or fluid is removed, the valve stem 65 can be returned to its initial, or closed, position by rotating the valve stem 65 in an opposite direction, allowing the ball 20 to seal against the seat 25. FIG. 2 depicts the system 100 in a closed valve condition, while FIG. 6 depicts the system 100 in an open valve condition where the valve stem 65 has moved downwards and into contact with stopper 20.

The valve stem 65 may be moved by a variety of mechanisms. For example, the valve stem 65 may have a mechanism comprising a handle extending from its main body in order to provide leverage for turning the valve stem. Alternatively, the valve stem 65 may have a configuration proximate its first end 70 to allow for connection of a tool or other device to assist with turning the valve stem 65. One such acceptable configuration is a hex head opening in the first end 70 such that a wrench or socket may be coupled to the first end 70 to turn the valve stem 65.

The inspection system 100 also comprises a sealing mechanism 85 for sealing between the tube 35 and the valve stem 65, as shown in FIGS. 2, 4, and 5. Although a variety of seals can be used, an acceptable sealing configuration for the region between the tube 35 and adjustable insert 65 is an O-ring. This O-ring maybe fabricated of rubber, a composite material or metal.

Referring back to FIG. 3, the pipeline inspection system 100 also comprises a fastener 90, such as a bolt or cap, sized to be received within the bore 5 of flange body 1 when the adjustable insert 30 is not being utilized. The fastener 90 may be threaded in order to engage internal threads of the bore 5. The fastener 90 can be removed and replaced with the adjustable insert 30 when there is a need to check a pressure level behind the flange body 1 or to remove a fluid in the pipeline behind the flange body 1.

Although threaded engagements are disclosed at a number of locations for the present invention, it is to be understood that the scope of the invention is not limited to threaded couplings, but could include alternative forms of engagement. Such alternate forms include snap fits, compression seals, or other removable forms of engagement.

Attachment of the flange body 1 to the pipeline can occur through several means. In one embodiment, the flange body 1 of the present invention comprises evenly distributed plurality of bolt holes 3 extending through the flange body 1 for connecting the flange body 1 to a pipeline or vessel (not shown). In another example, the flange body 1 and a pipeline vessel are connected via a compression coupling, such as a C-clamp or plurality of C-clamps. Alternatively, a circumferential clamp can be used to join the outer circumference of the flange body 1 and the pipeline or vessel.

In an alternate embodiment of the present invention, a method of adjusting a valve in a pipeline flange is disclosed where the method comprises removing a fastener from a bore of a flange body and placing an adjustable insert in the bore, where the insert comprises a tube and an adjustable valve stem as discussed above. The valve stem is then adjusted towards and into contact with a valve device, causing the valve device to open. Once the valve device opens, a pressure measurement from behind the flange can be obtained. If the pressure behind the flange body is higher than atmospheric pressure, it suggests that there is oil, gas, or other fluid behind the flange. Operators can remove the oil, gas, or other fluid from the pipeline before removing the flange by venting gases out or drawing the pipeline contents out with a vacuum. Thus, the apparatus and method provided by this invention will ensure the safety of operators and avoid pollution problems caused by the leak or spillage of oil, gas, or other fluid.

In yet another embodiment of the present invention, a method of removing fluid from within a pipeline is provided. The method comprises a removing a fastener from a flange of a pipeline and placing an adjustable insert in the bore of the flange body, where the insert comprises a tube and valve stem adjustably-coupled to the tube, as discussed above. Then, a vacuum device is attached to an outlet of the tube, and the position of the valve stem is adjusted towards and into contact with a valve device, causing the valve device to open. Once the valve device is open, fluid can be removed from behind the flange and inside the pipeline.

Metals or other materials that do not corrode in petroleum products are preferably used to manufacture the apparatus of the present invention. Such metals include steel (including carbon steel, HASTELLOY®, and stainless), aluminum, aluminum alloys, titanium, and combinations thereof. Non-metal materials include ceramic, carbon fibers, nylon, propylene, ethylene, and polyester. The apparatus of the present invention can also be made by a mixture of metals and non-metals.

Although a preferred embodiment of this invention has been disclosed, a worker of ordinary skill in this art would recognize that certain modifications would come within the scope of this invention. The present invention is not to be limited to the shape and sizes as disclosed above. Instead, one of ordinary skill in the art will appreciate that the specific sizes and shapes of the components discussed may vary. For that reason, the following claims should be studied to determine the true scope and content of this invention. Since many possible embodiments may be made of the invention without departing from the scope thereof, it is to be understood that all matter herein set forth or shown in the accompanying drawings is to be interpreted as illustrative and not in a limiting sense.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Having thus described the invention, what is claimed is:
1. A pipeline inspection system comprising:
   a flange body having a first surface, an opposing second surface, and a bore extending therethrough;
   a valve device positioned within the flange body, such that when in a closed position, the valve device having a retainer positioned in contact with the second surface of the flange body, a spring, a stopper, and a seat, the seat being in contact with internal walls of the bore and where the spring positions the stopper in contact with the seat providing a sealing surface;
   an adjustable insert comprising:
      a tube secured to the flange body and having a first tube end, an opposing second tube end, and one or more outlets through a wall of the tube;
      a valve stem adjustably-coupled to the tube, the valve stem having a first end and an opposing second end, the second end sized to engage the valve device; and,
   a sealing mechanism between the tube and the valve stem;
   wherein the valve stem translates within the tube to selectively contact and open the valve device, thereby allowing flow of pipeline contents through the valve device and to the one or more outlets on the tube.

2. The pipeline inspection system of claim 1, wherein the stopper is a ball valve.

3. The pipeline inspection system of claim 2, wherein the second end of the valve stem contacts the ball valve, causing the ball valve to compress the spring and move the retainer away from the second surface of the flange body.

4. The pipeline inspection system of claim 1 further comprising a mechanism for adjusting a position of the valve stem within the tube.

5. The pipeline inspection system of claim 1, wherein the sealing mechanism comprises an O-ring.

6. The pipeline inspection system of claim 1 further comprising a fastener configured to engage with internal threads in the bore of the flange body.

7. The pipeline inspection system of claim 1 further comprising a vacuum device coupled to the one or more outlets on the tube of the adjustable insert.

8. The pipeline inspection system of claim 1 further comprising a pressure gauge coupled to the one or more outlets on the tube of the adjustable insert.

9. The pipeline inspection system of claim 1, wherein space between an inner diameter of the tube and an outer diameter of the valve stem forms a passageway for connecting the valve device to a pressure gauge or vacuum device.

10. A pipeline inspection system comprising:
a flange body having a first surface, an opposing second surface, and a bore extending therethrough;
a valve device positioned within the flange body;
an adjustable insert comprising a tube secured to the flange body and having a first tube end, an opposing second tube end, one or more outlets through a wall of the tube, a plurality of external threads proximate the first tube end, a plurality of internal threads proximate the second tube end, and a plurality of threads located along an outer surface of a valve stem, where the valve stem is adjustably-coupled to the tube, the valve stem having a first end and an opposing second end, the second end sized to engage the valve device; and,
a sealing mechanism between the tube and the valve stem;
wherein the valve stem translates within the tube to selectively contact and open the valve device, thereby allowing flow of pipeline contents through the valve device and to the one or more outlets on the tube.

11. The pipeline inspection system of claim 10, wherein the valve device having a retainer positioned in contact with the second surface of the flange body, a spring, a stopper, and a seat, the seat being in contact with internal walls of the bore and where the spring positions the stopper in contact with the seat providing a sealing surface.

12. The pipeline inspection system of claim 10 further comprising a mechanism for adjusting a position of the valve stem within the tube.

13. The pipeline inspection system of claim 10, wherein the sealing mechanism comprises an O-ring.

14. The pipeline inspection system of claim 10 further comprising a fastener configured to engage with internal threads in the bore of the flange body.

15. The pipeline inspection system of claim 10 further comprising a vacuum device coupled to the one or more outlets on the tube of the adjustable insert.

16. The pipeline inspection system of claim 10 further comprising a pressure gauge coupled to the one or more outlets on the tube of the adjustable insert.

17. The pipeline inspection system of claim 10, wherein space between an inner diameter of the tube and an outer diameter of the valve stem forms a passageway for connecting the valve device to a pressure gauge or vacuum device.

* * * * *